United States Patent
Gibbs

(10) Patent No.: US 10,115,110 B2
(45) Date of Patent: *Oct. 30, 2018

(54) PET FEEDING SYSTEM

(71) Applicant: Andy H. Gibbs, Tucson, AZ (US)

(72) Inventor: Andy H. Gibbs, Tucson, AZ (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/936,363

(22) Filed: Mar. 26, 2018

(65) Prior Publication Data

US 2018/0218373 A1 Aug. 2, 2018

Related U.S. Application Data

(63) Continuation of application No. 15/596,918, filed on May 16, 2017, now Pat. No. 9,928,511.

(Continued)

(51) Int. Cl.
| | |
|---|---|
| *G06Q 30/00* | (2012.01) |
| *A01K 29/00* | (2006.01) |
| *G06K 7/10* | (2006.01) |
| *G08B 21/18* | (2006.01) |
| *H04W 4/02* | (2018.01) |
| *A01K 5/01* | (2006.01) |

(52) U.S. Cl.
CPC ............ *G06Q 30/014* (2013.01); *A01K 5/01* (2013.01); *A01K 29/005* (2013.01); *G06K 7/10366* (2013.01); *G06K 7/10386* (2013.01); *G08B 21/182* (2013.01); *H04W 4/023* (2013.01)

(58) Field of Classification Search
CPC ....... G06Q 30/014; A01K 5/01; A01K 29/005
See application file for complete search history.

(56) References Cited

U.S. PATENT DOCUMENTS

| | | |
|---|---|---|
| 3,508,183 A | 4/1970 | Pinckard |
| 3,611,998 A | 10/1971 | Loscalzo |

(Continued)

FOREIGN PATENT DOCUMENTS

| | | |
|---|---|---|
| EP | 1139785 | 12/2005 |
| GB | 2475583 A | 5/2011 |

OTHER PUBLICATIONS http://www.ottopetcaresystems.com; Web Page for Integrated Well-being Solution for Your Pet; Jan. 4, 2016.

(Continued)

*Primary Examiner* — Curtis Odom
(74) *Attorney, Agent, or Firm* — Neustel Law Offices

(57) ABSTRACT

A pet feeding system for effectively communicating information between a packaged consumable product for pets and a device. The pet feeding system generally includes a container that stores a volume of a consumable product for a pet, a tag attached to the container that stores product data corresponding to the consumable product within the container, and a monitor device configured to wirelessly communicate with the tag when the tag is near the monitor device. The monitor device is configured to receive the product data from the tag and determine if the consumable product associated with the tag is acceptable for consumption by a pet using the product data. The monitor device is configured to provide an alert to the user if the consumable product associated with the tag is identified by the monitor device as having a consumption problem for the pet.

20 Claims, 14 Drawing Sheets

Related U.S. Application Data

(60) Provisional application No. 62/336,828, filed on May 16, 2016.

(56) References Cited

U.S. PATENT DOCUMENTS

| | | | |
|---|---|---|---|
| D279,445 S | 7/1985 | Jagger | |
| 4,800,845 A | 1/1989 | Budd | |
| 5,975,016 A | 11/1999 | Wesenhagen | |
| 6,179,377 B1 | 1/2001 | Harper | |
| D439,707 S | 3/2001 | Hansen | |
| 6,311,644 B1 | 11/2001 | Pugh | |
| 6,318,291 B1 | 11/2001 | Wolanski | |
| 6,358,546 B1 | 3/2002 | Bebiak | |
| 6,493,641 B1 | 12/2002 | Singh | |
| D473,758 S | 4/2003 | Wilson | |
| 6,576,280 B2 | 6/2003 | Bebiak | |
| 6,691,639 B2 | 2/2004 | Singh | |
| 6,868,804 B1 | 3/2005 | Huisma | |
| D506,294 S | 6/2005 | Boje | |
| 7,152,036 B2 | 12/2006 | Gizzio | |
| 7,380,518 B2 | 6/2008 | Kates | |
| 7,513,216 B2 | 4/2009 | Neckel | |
| 7,617,132 B2 * | 11/2009 | Reade | G06Q 20/208 705/26.61 |
| D607,616 S | 1/2010 | Newsome | |
| D647,668 S | 10/2011 | Siklosi | |
| D662,674 S | 6/2012 | Tsengas | |
| D669,231 S | 10/2012 | Chance | |
| D679,455 S | 4/2013 | Chance | |
| D683,190 S | 5/2013 | Shields | |
| 8,627,786 B2 | 1/2014 | Arthur | |
| D706,995 S | 6/2014 | Modi | |
| 8,797,166 B2 | 8/2014 | Triener | |
| 8,930,148 B2 | 1/2015 | Huisma | |
| 9,149,022 B2 | 10/2015 | Triener | |
| D774,834 S | 12/2016 | Breit | |
| 9,623,578 B1 | 4/2017 | Aminpour | |
| 2002/0185073 A1 | 12/2002 | Fullerton | |
| 2003/0106498 A1 | 6/2003 | Mersits | |
| 2005/0039690 A1 | 2/2005 | Sage, Jr. | |
| 2005/0279287 A1 | 12/2005 | Kroeker | |
| 2006/0213447 A1 | 9/2006 | Kitchen | |
| 2007/0137584 A1 | 6/2007 | Travis | |
| 2007/0181068 A1 | 8/2007 | McKeown | |
| 2008/0031433 A1 | 2/2008 | Sapp | |
| 2009/0299821 A1 | 12/2009 | Willcocks | |
| 2010/0263596 A1 | 10/2010 | Schumann | |
| 2010/0299074 A1 | 11/2010 | Chang | |
| 2011/0139076 A1 | 6/2011 | Pu | |
| 2011/0148639 A1 | 6/2011 | Geissler | |
| 2011/0192351 A1 | 8/2011 | Jackson | |
| 2011/0253054 A1 | 10/2011 | Hargrove | |
| 2011/0308470 A1 | 12/2011 | Vermeegen | |
| 2012/0089340 A1 | 4/2012 | Huisma | |
| 2012/0199076 A1 | 8/2012 | Biede | |
| 2012/0325156 A1 | 12/2012 | Abramson | |
| 2013/0125823 A1 | 5/2013 | Simon | |
| 2016/0012748 A1 | 11/2016 | Donavon | |
| 2017/0071155 A1 | 3/2017 | Gailen | |

OTHER PUBLICATIONS https://www.indiegogo.com/projects/otto-petcare-systems-for-dogs-and-cats#; Web Page for Activity Tracker + Connected Food Dispenser; Jan. 4, 2016.

* cited by examiner

FOOD TAG SYSTEM COMPONENTS
Block Diagram

FEEDING BOWL COMPONENTS
Block Diagram

FOOD ITEM COMPONENTS
Block Diagram

PET FEEDING SYSTEM

CROSS REFERENCE TO RELATED APPLICATIONS

The present application is a continuation of U.S. application Ser. No. 15/596,918 filed on May 16, 2017 which issues as U.S. Pat. No. 9,928,511 on Mar. 27, 2018, which claims priority to U.S. Provisional Application No. 62/336,828 filed May 16, 2016. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a pet feeding system for effectively communicating information between a packaged consumable product for pets and a device.

Related Art

Any discussion of the related art throughout the specification should in no way be considered as an admission that such related art is widely known or forms part of common general knowledge in the field.

Food for domesticated animals such as dogs and cats is typically produced at a food manufacturing facility, and subsequently packaged and distributed to the animal owner through various wholesale and retail distribution channels. Food packaging typically consists of sealed bags, cans, cartons, hybrid "pop-top" containers and foil or cellophane wrapped packages. The food types may include dry kibble, wet food, frozen foods, freeze-dried or dried foods and treats. These processes, food types, food packaging containers and distribution methods are well known in the pet products industry.

The US Food and Drug Agency regulates pet food safety under the Federal Food, Drug and Cosmetic Act, codified as Title 21, United States Code, Chapter 9. There are three types of recalls: voluntary producer recall, recall under FDA request, or recall under FDA order under statutory authority.

In 2007, contaminated pet foods killed an estimated 50,000 US dogs and cats, and resulted in over $500 million in food recall, litigation and damages costs to pet food manufacturers. The FDA stepped up its pet food monitoring and recall authority since the 2007 incident. Since 2008, the FDA has issues nearly 250 pet food and drug recalls. These recalls cover thousands of unique brands, and have included more than 20 millions cans of food, and well over 50 million pounds of dry food. Food recalls cost manufacturers from a few million dollars, to losses well over $50 million.

Despite the frequency, economic impact and social impact of recalls associated with pet foods, there exists no reliable method to alert pet owners when the pet food is recalled, and when they should cease feeding the food to their pet. Further, many dietary supplements and prescription medications are fed to dogs and cats. These products carry the same risks of contamination as food. Similarly, these products are distributed through a supply chain that has no reliable means of tracking the food to the ultimate pet consuming the item, or of preventing the feeding of the supplements or medications to the animal.

SUMMARY

An example embodiment is directed to a pet feeding system. One or more of the various embodiments of the present invention manage pet food throughout the supply chain, from food component source acquisition to ultimate consumption by pet animals. Further, one or more of the various embodiments teaches a system and method of alerting the pet owner at the moment of feeding a recalled food or medication to the animal, and further provides for the monitoring of the location and volume of consumed and non-consumed recalled animal foods, supplements and medications.

Therefore, one exemplary embodiment is a supply chain management system that minimizes a food manufacturer's liability, risk and financial exposure related to food, supplement or medication recalls.

Another exemplary embodiment is a food supply chain system and method that associates each manufactured food, supplement or medication product to a specific animal.

Another exemplary embodiment is a communication network providing for the tracking of actual consumption of each food item, in real time.

Another exemplary embodiment provides for the communication between supplier of food, supplements or medications, and the owner of an animal, the communication occurring at the time the owner is ready to feed the animal.

There has thus been outlined, rather broadly, some of the embodiments of the pet feeding system in order that the detailed description thereof may be better understood, and in order that the present contribution to the art may be better appreciated. There are additional embodiments of the pet feeding system that will be described hereinafter and that will form the subject matter of the claims appended hereto. In this respect, before explaining at least one embodiment of the pet feeding system in detail, it is to be understood that the pet feeding system is not limited in its application to the details of construction or to the arrangements of the components set forth in the following description or illustrated in the drawings. The pet feeding system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
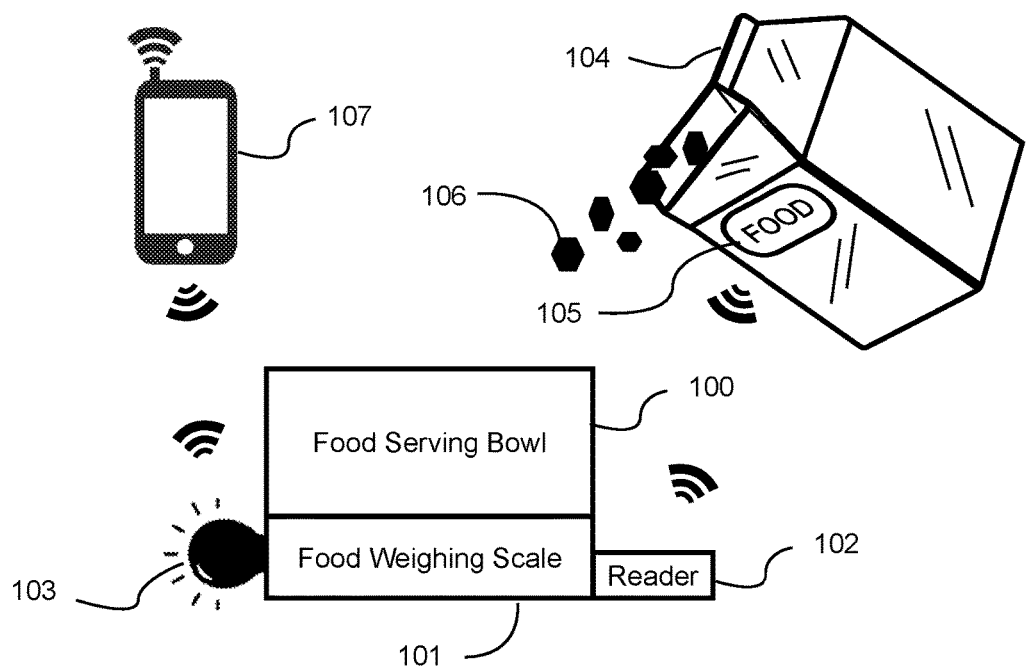
FIG. 1 is an exemplary diagram illustrating a devices and functions of a food tag transponder system in accordance with an example embodiment.

A. Overview.

Various aspects of specific embodiments are disclosed in the following description and related drawings. Alternate embodiments may be devised without departing from the spirit or the scope of the present disclosure. Additionally, well-known elements of exemplary embodiments will not be described in detail or will be omitted so as not to obscure relevant details. Further, to facilitate an understanding of the description, a discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments" is not exhaustive and does not require that all embodiments include the discussed feature, advantage or mode of operation.

The various embodiments of the present invention provides for the wireless communication at least between a food item and a feeding bowl, or between a food item and a smartphone. The communication between the objects just described incorporating wireless devices, readers, and tags is well known to those skilled in the art, and comprise a large body of work. It is not the intention to limit the types of wireless devices, readers or tags, the non-limiting description of wireless devices, readers, and tags as follows may be used interchangeably without any difference in meaning or intention.

An example pet feeding system generally includes a container that stores a volume of a consumable product for a pet, a tag attached to the container that stores product data corresponding to the consumable product within the container, and a monitor device configured to wirelessly communicate with the tag when the tag is near the monitor device. The monitor device is configured to receive the product data from the tag and determine if the consumable product associated with the tag is acceptable for consumption by a pet using the product data. The monitor device is configured to provide an alert to the user if the consumable product associated with the tag is identified by the monitor device as having a consumption problem for the pet.

B. Wireless Devices and Readers.

Wireless communication technologies such as radio-frequency identification (RFID) and near field communication (NFC) utilize radio waves to wirelessly transfer data from a wireless device to a reader in a contactless manner.

There are various types of wireless devices in use today that utilize wireless communications such as RFID and NFC. Examples of wireless devices include but are not limited to proximity cards, passive cards, active cards, smart cards (with or without contacts), security cards, identification badges or identification cards, passports, payment devices, electronic devices and smartphones.

A reader may be comprised of various types of electronic devices adapted for receiving radio signals from wireless devices such as a passive reader or an active reader, wherein an active reader also transmits radio signals to be received by the wireless device.

C. Tags in Wireless Devices.

The wireless device includes a "tag" (also known as transponder, RFID tag, RFID Chip, NFC tag, NFC chip) that stores data and wirelessly communicates with the reader via radio-frequency electromagnetic fields in either a duplex communication manner or a half-duplex communication manner. Tags may also be comprised of a read/write configuration that are programmable by the reader.

A tag is comprised of an integrated circuit and an antenna connected to the integrated circuit. An active tag includes a battery to provide electrical power and a passive tag includes a capacitor to store energy received from the radio signal of the reader. The tag may be comprised of various tag technologies.

The integrated circuit in the tag is for storing and processing information, modulating and demodulating a radio-frequency (RF) signal, collecting DC power from the reader signal and other functions. The integrated circuit includes memory to store various types of data (e.g. pet and owner identification data, product ordering data, logistics data, food production data, food portion data). The integrated circuit also includes either a chip-wired logic or a programmed (or programmable) data processor for processing data received and to be sent.

The antenna in the tag is for receiving a radio signal from a reader and/or transmitting a radio signal to the reader. With a passive tag technology, the antenna also provides electrical power to integrated circuit without a battery via magnetic induction between the antenna and the reader located within each other's near field.

FIG. 1 is an exemplary diagram illustrating a devices and functions of a food tag transponder system comprised of a packaged food item 104 to which a tag is affixed, in this drawing, embedded into a label 105, a food serving bowl 100 into which food 106 from the food container will be poured. The food serving bowl, bring in communication with a scale 101 provides for the accurate and real-time monitoring of the amount of food being poured into the bowl. A tag reader 102 in communication with a processor not shown wirelessly receives certain data from the tag in the food label 105 relating to the preferred weight of the food serving. Having computed a match between the preferred weight of the food serving and the actual weight as computed by the scale, the processor not shown activates a visual indicator via one of many means including illuminating a light 103, and/or providing a message on a wireless device such as a smartphone 107, thereby alerting to the food giver that the proper food portion has been entered into the bowl 100.

Figure 2:
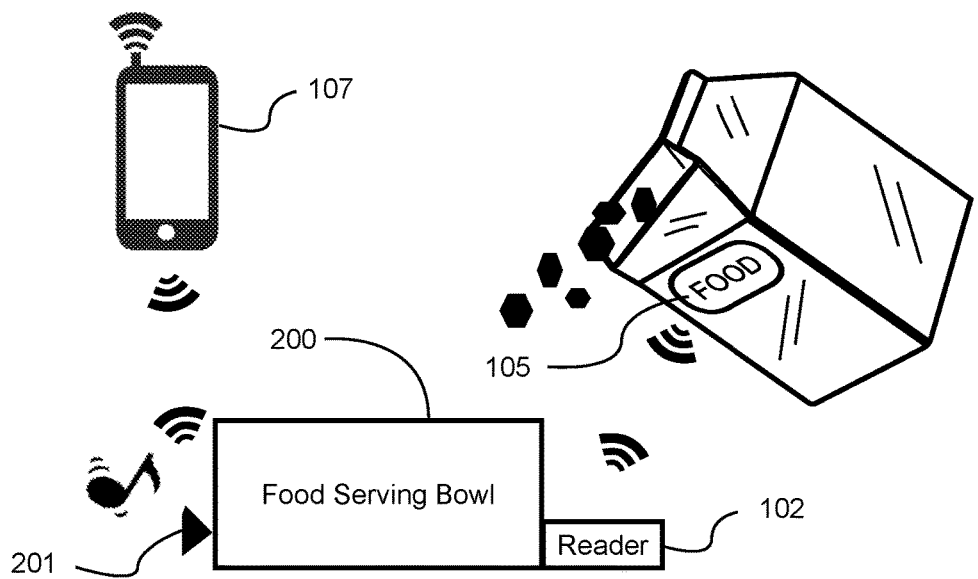
FIG. 2 is an exemplary diagram illustrating a devices and functions of a food tag transponder system.

FIG. 2 is an exemplary diagram illustrating a devices and functions of a food tag transponder system. As a variation to the system and method just described, the variation shows a food serving bowl 200 into which a food weighing capability not shown has been integrated, for instance, a pressure sensor and transducer, or an analog to digital scale. As another variation, a tag reader 102 in communication with a processor not shown wirelessly receives certain data from the tag in the food label 105 relating to the preferred weight of the food serving. Having computed a match between the preferred weight of the food serving and the actual weight as computed by the scale, the processor not shown activates an audible indicator via one of many means including activating a sound 201, and/or providing an audible message or signal on a wireless device such as a smartphone 107, thereby alerting to the food giver that the proper food portion has been entered into the bowl 200.

Figure 3:
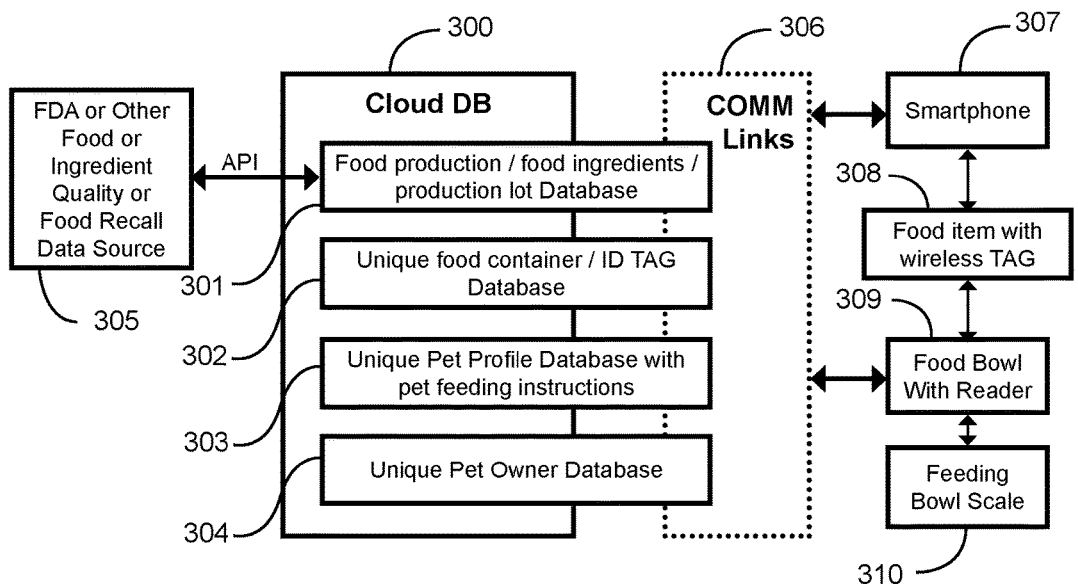
FIG. 3 is an exemplary illustration of a block diagram of the devices comprising a food tag system and method.

FIG. 3 is an exemplary illustration of a block diagram of the devices comprising a food tag system and method. More specifically, a cloud 300 database serves as a central server and data center incorporating a plurality of databases, the cloud being a database or plurality of databases residing on various devices including, but not limited to a wireless handheld device, a computer, or one or more computers or servers on a network such as the Internet. The use of the term "cloud" is not meant to be limiting, and defines the storage upon, communication with, and processing by the various devices and communication interfaces just mentioned.

Therefore, in the drawing, the cloud 300 is shown in communication with a smartphone 307, the communication link 306 therebetween being well known networks such as a cellular network, or a LAN, and a food bowl 309 comprising a tag reader in direct or indirect communication with the cloud via well-known means such as through a processor in a communication format for Bluetooth communication with a wireless device not shown, or via a LAN device such as a wireless router on the internet.

A plurality of data resides in the cloud including, but not being limited to a database containing food production data 301, the data at least including the source of food and/or food ingredients used to manufacture food, and production information, for example, data correlating purchased food ingredients to production lot numbers, dates, and other related information typically recorded by food manufacturers.

Another food container database 302 stores information related to individual containers into which manufactured food is packaged and associated with a unique tag ID. ID tag numbers are used throughout the product's lifecycle, then retained as archival records.

Another database 303 contains data related to unique animals. Data fields may include one or more of the following: owner's ID, pet weight, pet type, preferred daily portion of food the pet should eat, or any other information deemed relevant to pet nutrition and pet owners.

It should be noted that a corollary to the database just described would be a database containing only human information such as unique ID, size, weight, daily energy requirement, and other relevant nutritional information.

Another database 304 contains data related to each owner of each unique animal. Data fields may include one or more of the following: owner's name, address, email address, phone numbers, pet ID, food subscription purchase preferences, payment type preferences, or any other information deemed commercially relevant to pet owners.

Other databases may be added to the cloud from time to time, and the configuration, data structure or even the necessity of the databases just described may change from time to time to support evolving production, sales, customer relationship, or operations models.

An important component of the system and method of one or more of the various embodiments is the ability to correlate individual packages of food with food safety monitoring. This requires the ability to update data related to each food production lot with information obtained after the food is manufactured, packaged and distributed to customers. Such updates may include subsequent notice of contamination of a food ingredient from an upstream source.

One source of food safety monitoring information is the US Food and Drug Administration (FDA) that publishes warnings and food recall notices. Therefore, the drawing shows a perpetual link to the FDA 305 via an API, although the food safety data source is not limited to the FDA, nor to the necessity of an API. Data may be obtained from other sources, and may be manually entered into the database as information is obtained.

The system of one or more of the various embodiments further comprises a food measuring means 310 in communication with the food bowl 309, the measuring means being used to measure the portion of food that will be transferred from a food item with a wireless tag 308, information related to the tag, and the pet ID receiving the food being stored in the cloud as previously described.

Figure 4:
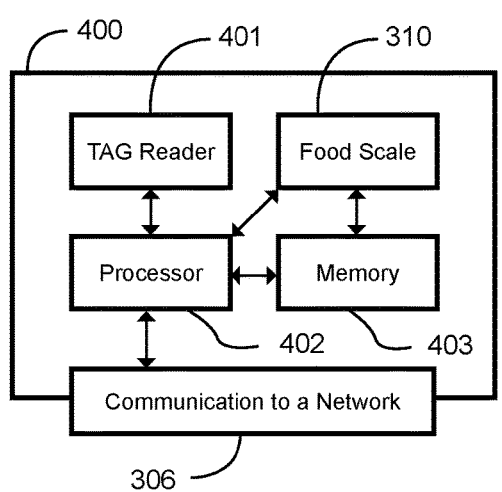
FIG. 4 is an exemplary illustration of a block diagram of a food bowl on a network.

FIG. 4 is an exemplary illustration of a block diagram of a food bowl on a network. In one variation, a food bowl 400 comprises a processor 402 in communication with a tag reader 401, a food measuring device such as a scale 301, a memory 403 and a means to communicate with a network 306. Together, the food bowl provides for communicating with a tag of a food package not shown, for determining the desired food portion, and for communicating to a person filling the bowl that the desired portion has been filled into the bow.

Figure 5:
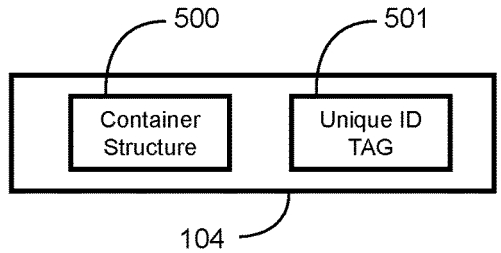
FIG. 5 is an exemplary illustration of a block diagram of components of a food container with a tag.

FIG. 5 is an exemplary illustration of a block diagram of components of a food container with a tag. More specifically, the simple representation of a food item 104 shows that the item comprises food contained within a container structure 500, and that a tag 501 is affixed to the structure. The methods of affixing a tag to a consumer product package are well known to those skilled in the art and include embedment into the actual structure material, laminating a tag upon a label that is affixed to the structure, or affixing the tag directly to the structure surface by an adhesive or similar means.

Figure 6:
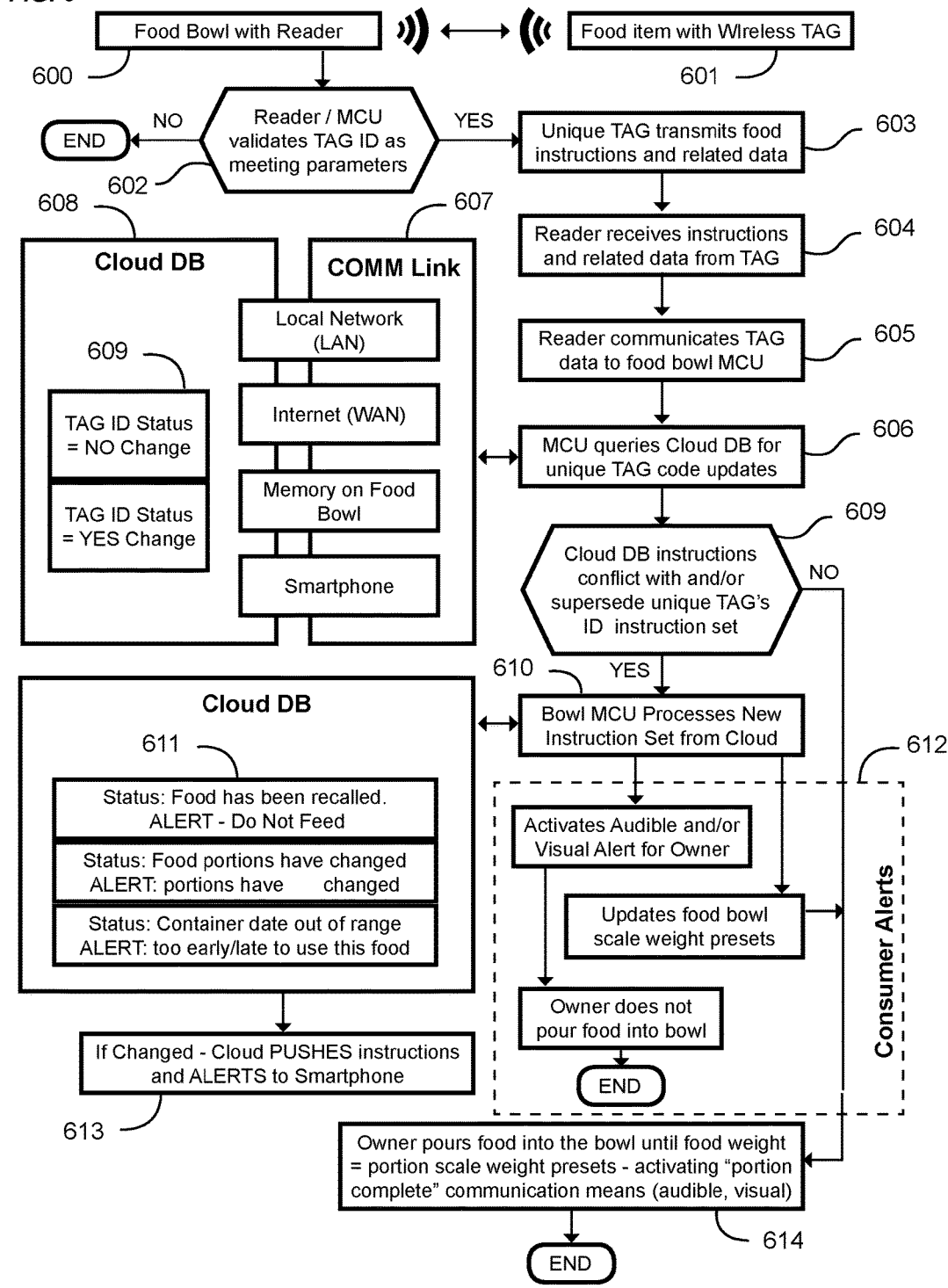
FIG. 6 is an exemplary diagram illustrating the process flow of a tagged food item and food bowl on a network.

FIG. 6 is an exemplary diagram illustrating the process flow of a tagged food item and food bowl on a network. In the drawing, a food bowl with a reader 600 has established communication with a tag on a food item 601. The reader 600 communicates the tag data to the processor not shown but incorporated into the feeding bowl system as previously described. The processor validates the tag ID 602 by one or more means such as comparing the ID to a lookup table contained on the processor's memory, or communicating the ID to the cloud with a validation request. If the tag cannot be validated, communication between the reader and tag is terminated.

If the tag is correctly validated, the tag 603 communicates to the reader, and the reader 605 receives and transmits to the processor, or MCU, certain data related to the food including at least the predetermined food portion. Upon receiving the tag ID and associated data, the MCU performs a lookup 606 to determine whether any of the data parameters transmitted from the tag have been superseded by any data contained in the cloud. It does this by communicating through various communication links 607, any one of which may be a LAN, WAN, local memory, or wireless connection to a smartphone that may have downloaded and stored such data, or to subsequently connect to the network via the smartphone.

In the simplest terms, the lookup of tag data will result in one of two statuses 609, those being that the data originally programmed into the tag remains unchanged, or that the programmed tag data has been superseded. If there is no change, no visual or audible feedback will be presented to the person filling the bowl, and the person continues to fill the bowl until the "full" alert is activated 614. On the other hand, if the MCU 610 identifies a newer version of the data, it receives specific information from the cloud relating to the version update. The update is made for any number of reasons, including but not limited to a food recall 611, daily feeding portion changes, or that the current date is outside of the recommended date range during which the food should be consumed. The date range may have expired prior to the current date, or may begin at a future date when compared to the current date. These just described reasons for superseding the previously programmed tag data are not exhaustive, but are merely presented as illustrative examples of the types of events that may cause the originally programmed tag data to change.

If the MCU identifies a changed condition, it processes the change into an appropriate alert 612. If the alert represents a food recall, the type of alert may be at least one of the activation of an audible or visual signal from the food bowl, or a push notification 613 to the smartphone associated with the tag and/or customer database.

On the other hand, if the changed condition is a change in food portions, which may not be uncommon for pets that are following a weight loss program, the MCU will simply update the food portion expectations for that particular meal, and re-set the scale parameters so that the owner, without knowing that specific food portions have changed, continues to fill the bowl until the "full" alert is activated 614.

Figure 7:
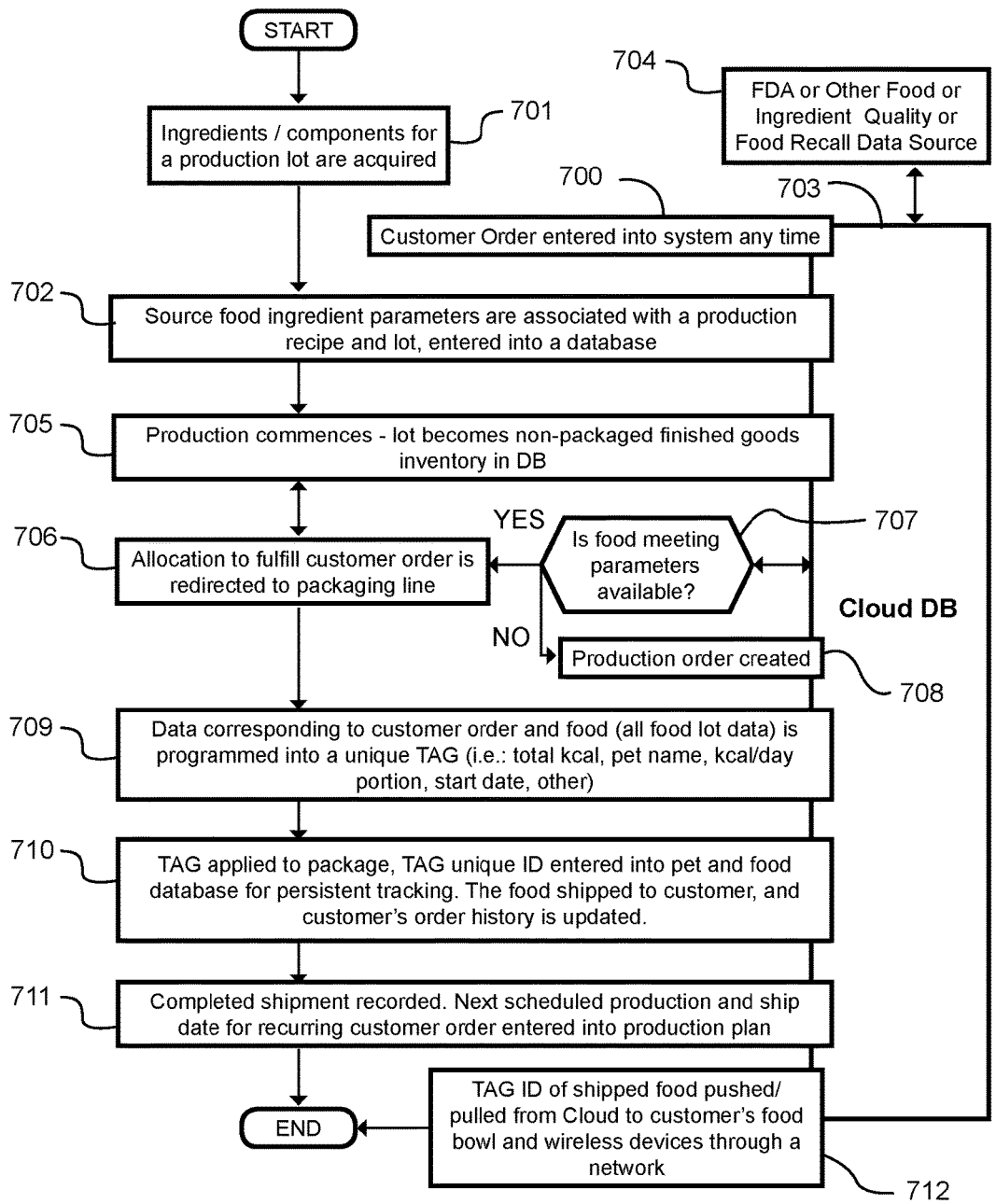
FIG. 7 is an exemplary diagram illustrating the process flow of a food item with a tag.

FIG. 7 is an exemplary diagram illustrating the process flow of a food item with a tag. At the start of any production cycle, food ingredients are acquired 701 from one or more suppliers. Various data related to each acquired food component are entered into a database as an inventory item that will later be associated with a given production lot 702. Inventory management systems are many, and are well known to those skilled in the art. As the production of a new food lot, or batch, commences 705, the batch becomes in-process inventory, and on completion is considered non-packaged finished goods ready for packaging. The database is correspondingly updated, tracking the ingredients throughout the production chain.

Based on an individual customer's order 700, the system of one or more of the various embodiments allocates the appropriate volume of in-process food 706 to the customer, and moves the food product to the packaging line 709 where the food will be packaged. A tag, programmed with data specific to the customer's food item as previously described, is affixed to the packaged food 710 and the food is shipped to the customer. The database is updated with the production data. Coincidentally, the shipping data is updated 711, and the customer's order history and planned future shipment information is updated, thereby scheduling the production requirements for future customer orders.

Various food source tracking systems are routinely used by artisans in the food production industry, and are well known. Since the results from lengthy food and ingredient quality and safety testing processes are often obtained after the manufactured food has entered the distribution channel, it is important to maintain a persistent data connection between a standard food safety data source and the food and ingredients produced, packaged and shipped. One data source is the FDA 704 which routinely tests food products for safety, the FDA. FDA food safety and recall data being correlated to the food ingredients, sources and production lots provides the trigger to update the originally programmed tag data in the database so that when the tag communicates with the database via the food bowl reader 712, the conflict between the originally programmed, and the updated tag data will subsequently trigger a food alert as previously described.

D. Subscription Orders as a Method of Driving JIT Production.

The various embodiments of the present invention further teaches a novel method of scheduling food production using subscription-based food sales, and more precisely, buy monitoring and analyzing actual food consumption data by each pet owned by each subscribing customer.

In a typical production planning, inventory creation and sales system, food production planning is based generally on historical production data, and product sell-through data. The various embodiments of the present invention provide for the estimated appropriate daily energy requirements (in kcal) of each pet for which food is purchased, to drive future production planning, packaging and logistics capacity.

More specifically, in one or more of the various embodiments, a customer order 700 entered into the system of one or more of the various embodiments contains the precise daily kcal requirements for the pet that will consume the food. The kcal/volume ratio, as well as the projected future delivery dates of each recurring food subscription delivery, all of which are known by the food manufacturer under one or more of the various embodiments, establishes the volume of ingredients and production schedules required to meet the delivery schedules. As the pet's actual consumption changes during the pet's lifetime, the daily energy requirements in kcal are modified by a processor not shown, the newly processed data thereby driving modifications to the production planning volumes.

Therefore, if an initial order meeting the production schedule results in an inadequate immediate supply of food required to fulfill the order, one of the production parameters 707, a production order for the precise number of kcals specified by the order is entered into a production order database 708. Thereafter, and at each subscription renewal period, for instance, one calendar week, the future recurring subscription requirements are entered into the production planning database in advance of the actual production schedule as a means of manufacturing the food just in time for shipping to the customer under the preferred subscription purchasing terms.

Figure 8:
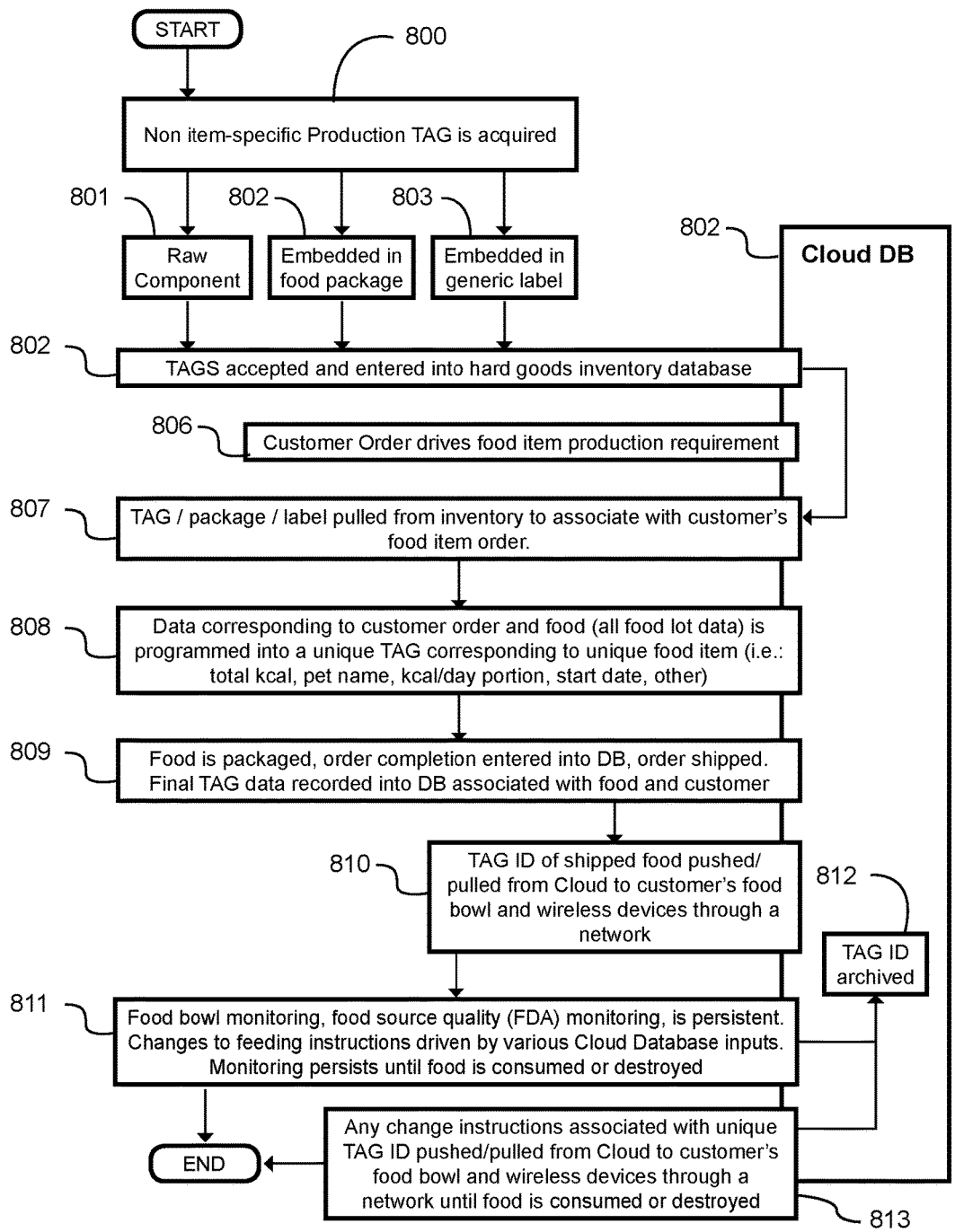
FIG. 8 is an exemplary diagram illustrating the process flow throughout the lifecycle of a tag.

FIG. 8 is an exemplary diagram illustrating the process flow throughout the lifecycle of a tag. The systems, processes and methods of one or more of the various embodiments provide for a predictable life cycle for each individual tag. Although many tag manufacturers provide for some level of programming of tags before being shipped to commercial tag purchasers, for clarity, tag data as referred to herein discounts any pre-programmed information, and assumes that tag data includes the information minimally required to provide for the communication between a food item with a tag and a food bowl, and additional data corresponding to food ingredients, safety updates, portion changes, and other types of data previously described.

A tag is acquired from a tag manufacturer 800, the tag being either a raw, un-programmed IC package 801, already embedded within a food container 802, or embedded into a generic, printable label 803. The three tag configurations are not exhaustive, but merely serve as three examples of the many configurations of tags as may be preferred by the many manufacturers.

As is typical in a manufacturing environment, purchased good are added to an inventory database 802 for later use in production. As the customer order drives the JIT production requirement 806, a tag previously entered into inventory is pulled, decrementing the total inventory count in the database 807. The tag will be programmed with data specific to the customer and food item 808, the types of such data being previously described. The tag then accompanies the food item through a logistics/shipping process until it reaches the ultimate consumer. Upon use by the consumer, the tag, in indirect communication with the cloud 810 begins a food consumption monitoring process 811 that continues until the food is consumed.

E. Monitoring the Totality of a Food Production.

This novel process, for the first time, provides for the database to retrieve daily dispensing of a food portion, analyze each food portion against the estimated food portion, and decrement the retrieved volume of food poured from the container from the total volume originally delivered in the container. This process allows the database to identify when the entire food container is emptied of food.

On the other hand, if as an illustrative example, the FDA issues a food recall for an ingredient incorporated into the food lot from this the container was filled, at the immediate instant of the issuance of the food recall, one or more of the various embodiments provides for the locating of every effected food package, and more importantly, provides immediate data related to the actual remaining volume of effected food that has not been consumed.

This process just described represents an entirely novel method of using a tag to track individual food products from upstream component sourcing by a food manufacturer, to ultimate consumption by pet dogs and cats.

Upon the computed exhaustion of the food contained within a container, the tag data associated with the food lot and customer is archived 812 and removed from the active system.

On the other hand, if a change is made to the tag data, for instance, a recall notice published by the FDA as previously described, the estimated food consumption rates, the percent of any given food lot that has been consumed, and the volume of food from any given production batch or lot can be instantly determined in real time, thereby providing the food supplier the ability to take appropriate action as a means to mitigate potential animal health issues or death, to retrieve food not yet consumed, to precisely enumerate the volume of food remaining in the marketplace, and to know with precision when the marketplace has been purged of all recalled food.

Figure 9:
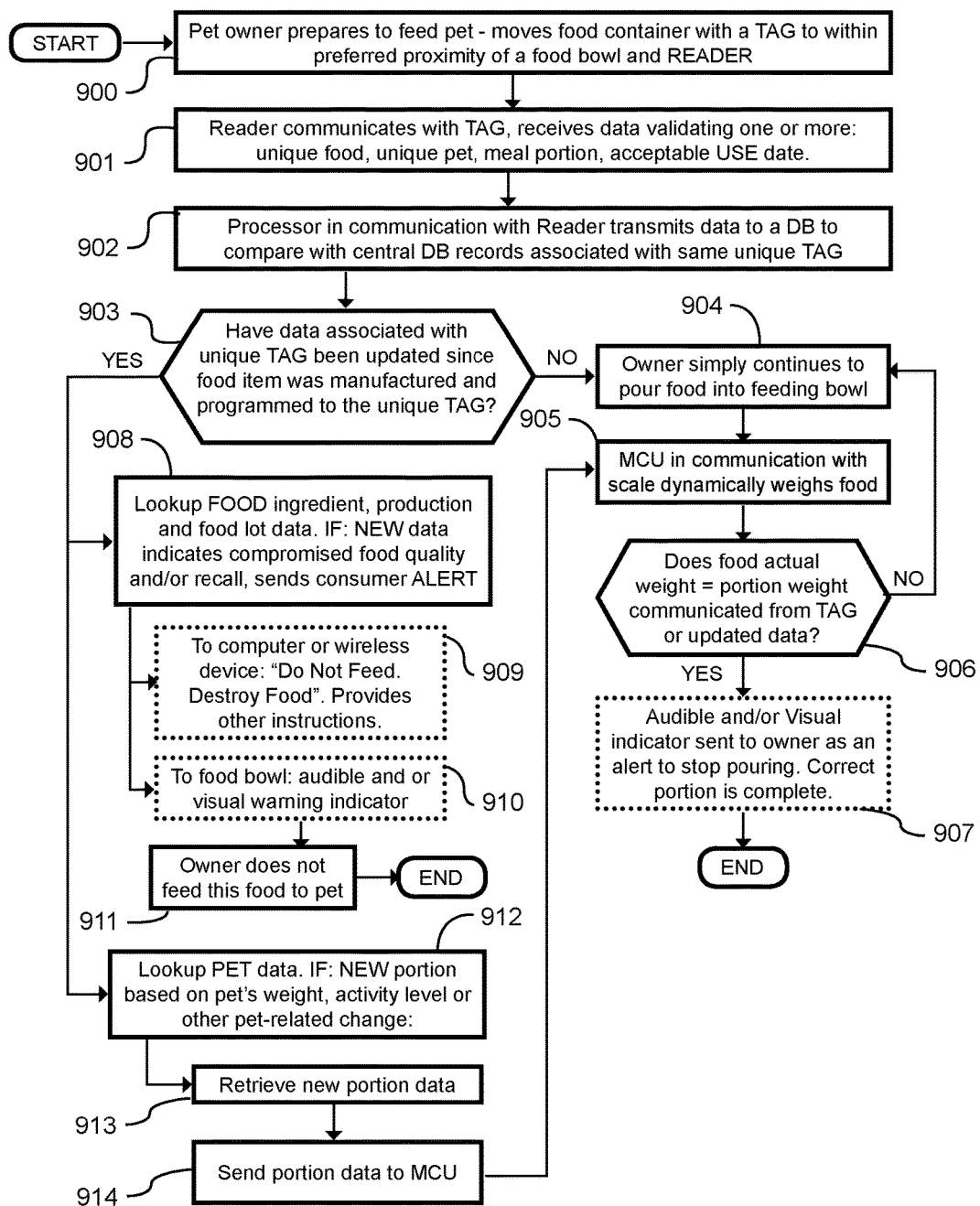
FIG. 9 is an exemplary diagram illustrating the process of alerting a pet owner.

FIG. 9 is an exemplary diagram illustrating the process of alerting a pet owner. In the drawing, a pet owner prepares to feed the pet by moving the food container with tag in proximity of the food bowl and reader 900 to facilitate the food transfer from container to bowl. The tag and reader being in communication 901 begin transferring authentication and food data. As previously described, the reader indirectly transmits the tag data to the cloud 902 for comparison to the originally programmed tag data.

If the actual tag data, or any components of the data, differ from the cloud data corresponding to the tag ID, the tag data will be deemed to have been updated.

Therefore, if the tag data and cloud data for the same tag are equal, the owner simply continues filling the bowl as planned 904 until the bowl MCU 905 determines that the poured-in food volume equals the expected volume 906. When equal conditions exist between expected and actual food volume occurs, the food pourer will be alerted by various visual and/or audible means 907 that the right food portion has been added to the bowl. The pourer stops pouring.

On the other hand, if the analysis of the tag data compared to the corresponding data on the cloud for that tag is not equal, the system provides for a lookup of each data field 908 as a means to determine what data fields have been updated. In the drawing, the illustrative example shows that the data mismatch between the programmed tag data and the current tag data on the cloud is a result of a food recall that affects this package of pet food. The food bowls MCU's determination of a food recall causes an alert signal 909 to be transmitted to the smartphone or wireless device associated with the particular food item, and triggers the activation of audible and/or visual alert indicators 910 proximate to the feeding bowl. In this case, catastrophe has been avoided since the pet owner does not feed this food to the pet 911.

However, the mismatch in data between the originally programmed tag and the corresponding data fields on the cloud may be the result of a portion adjustment to the pet's daily feeding regimen 912. The system of one or more of the various embodiments provides for the modified portion data to be communicated 913 to the bowl MCU, thereby adjusting the expected food weight 914 to equal the weight of the new portion.

Not knowing that any mismatch between the tag and the cloud data occurred, the pourer simply continues filling the bowl as planned 904 until the bowl MCU 905 determines that the poured-in food volume equals the updated expected volume 906. When equal conditions exist between expected and actual food volume occurs, the food pourer will be alerted by various visual and/or audible means 907 that the right food portion has been added to the bowl. The pourer stops pouring.

Figure 10:
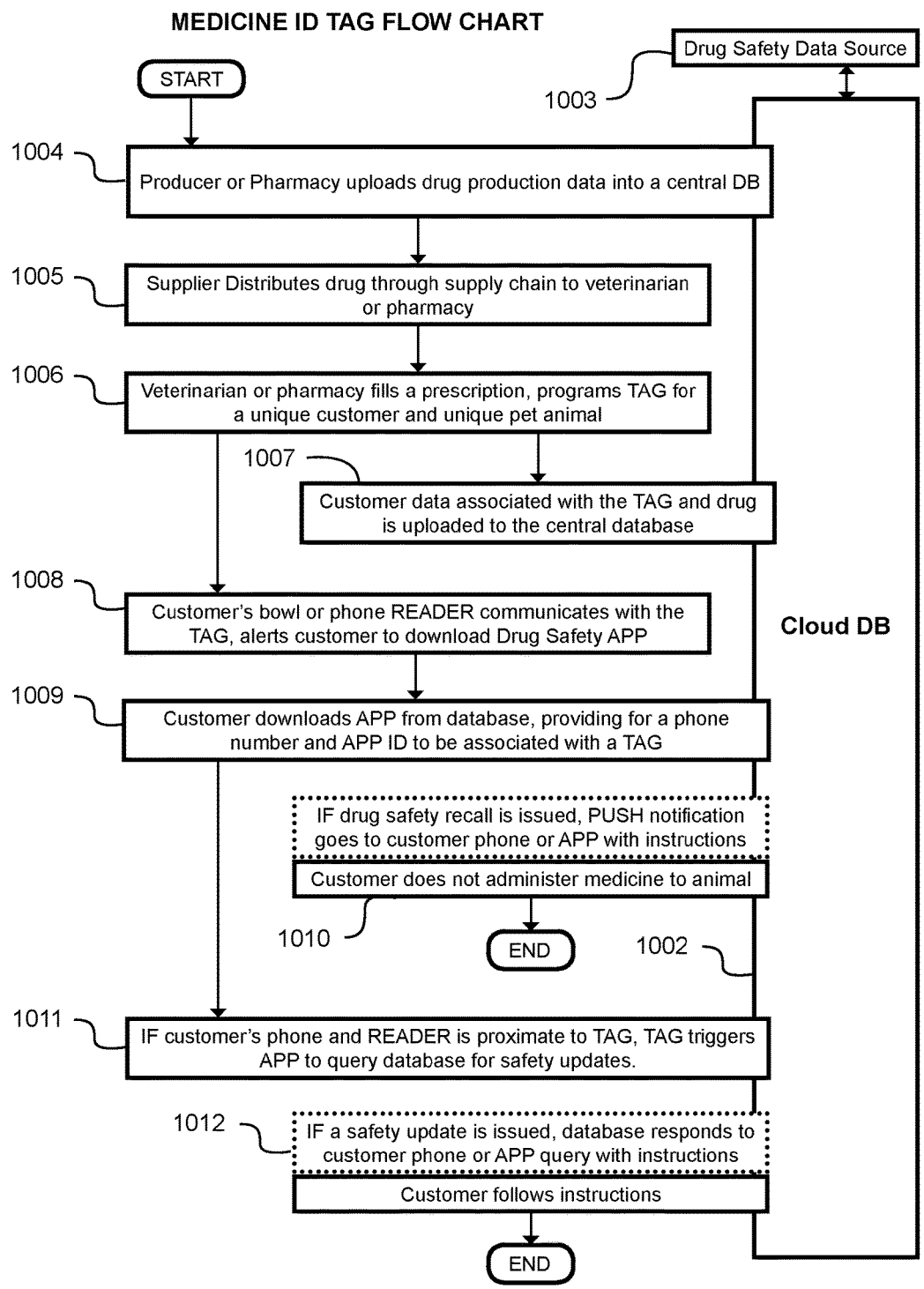
FIG. 10 is an exemplary diagram illustrating the process of alerting a pet owner.

FIG. 10 is an exemplary diagram illustrating the process of alerting a pet owner. In some instances it may be preferable to tag pet food supplements or medicaments as a means of maintaining a knowledge base of location, amount consumed and amount remaining at any given time. For instance, medicaments may be recalled after the veterinarian prescribes the medicament, and even after which time the pet owner begins administering the medicament.

In the drawing, a producer provides production data 1004 of the medicament into a production database 1002, the data comprising lab location, ingredient sources, processes, batch or lot information, or other data as preferred, not dissimilar to the food production data previously described.

In a traditional manner, the medicament supplier distributes the medicament to a pharmacy or veterinarian 1005 which then fills a prescription and, at the same time, programs the tag with patient information including the patient's email address and mobile phone number 1006, 1007.

Thereafter, the patient, typically the pet's owner, receives communication from the cloud recommending to download and install a mobile application 1009 that will allow push alerts to be sent to the patient's phone. If the patient's ID is associated with a food bowl with tag reader, any push notifications related to the medicament would also be pushed to the food bowl MCU.

If at any time the FDA or other safety monitoring data source 1003, the data from which is integrated into the cloud database, issues an alert, warning or recall for the medicament in the patient's possession, after the patient installs the wireless device app, the cloud servers will push the alert notification to the patient, thereby preventing the patient from administering the medicament 1010.

In the event that a push notification is not sent to the patient's app, anytime that the phone with integrated reader, or a reader enabled food bowl is proximate to the tag, the tag will trigger the app to query the database 1011 for safety or other medicament related updates. The database will respond to queries 1013 by sending responsive information to the patient's wireless device app, causing the patient to following the appropriate instructions.

Figure 11A:
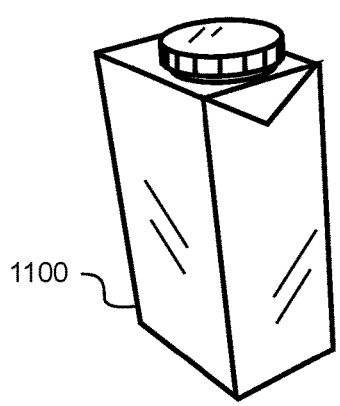
FIG. 11A is an exemplary diagram illustrating one variation of a food container.

FIG. 11A is an exemplary diagram illustrating one variation of a food container 1100, the food container comprising a box-like structure with a twist-off or pull-off re-closable cover. The container may have a tag embedded into the cover or material at the time the cover or material are manufactured, or may have a tag that was affixed directly, or indirectly, by means of a label affixed to the structure at the time food was introduced to the container during the manufacturing process.

Figure 11B:
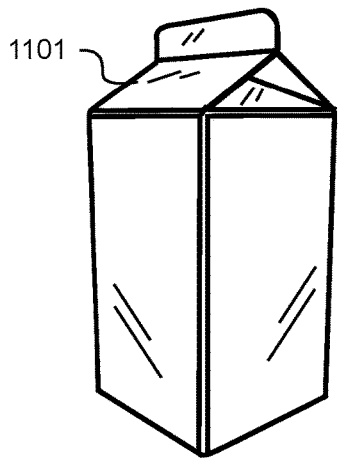
FIG. 11B is an exemplary diagram illustrating one variation of a food container.

FIG. 11B is an exemplary diagram illustrating another variation of a food container 1101, the food container comprising a box-like structure frequently used as a milk carton with a peel-open, re-closable pouring spout. The container may have a tag embedded into the structure at the time the structure or material used in the structure was manufactured, or may have a tag that was affixed directly, or indirectly, by means of a label affixed to the structure at the time food was introduced to the container during the manufacturing process.

Figure 11C:
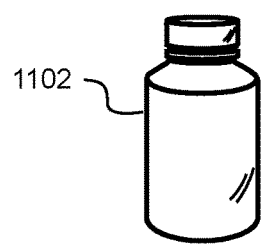
FIG. 11C is an exemplary diagram illustrating one variation of a food container.

FIG. 11C is an exemplary diagram illustrating another variation of a food container 1102, the food container comprising a jar-like structure frequently used for medicaments or nutritional supplements with a twist-open, re-closable pouring cover. The container may have a tag embedded into the cover or structure at the time the cover or structure was manufactured, or may have a tag that was affixed directly, or indirectly, by means of a label affixed to the structure at the time food was introduced to the container during the manufacturing process.

Figure 11D:
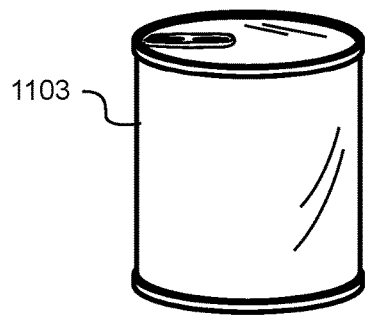
FIG. 11D is an exemplary diagram illustrating one variation of a food container.

FIG. 11D is an exemplary diagram illustrating another variation of a food container 1103, the food container comprising a metallic can structure frequently used wet pet foods with a pop-open top, or a sealed top openable by use of a typical can opener. The metal container may have a tag that was affixed directly, or indirectly, by means of a label affixed to the structure at the time food was introduced to the container during the manufacturing process.

Figure 11E:
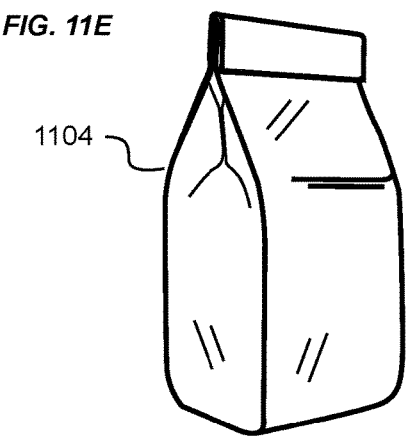
FIG. 11E is an exemplary diagram illustrating one variation of a food container.

FIG. 11E is an exemplary diagram illustrating another variation of a food container 1104, the food container comprising a bag-like structure frequently used for dry pet foods with a tear open top. A variation of a bag-like structure may incorporate a zip-lock feature allowing for easy re-opening and re-closing of the bag after opening. The container may have a tag embedded into the structure material at the time it was manufactured, or may have a tag that was affixed directly, or indirectly, by means of a label affixed to the structure at the time food was introduced to the container during the manufacturing process.

Figure 11F:
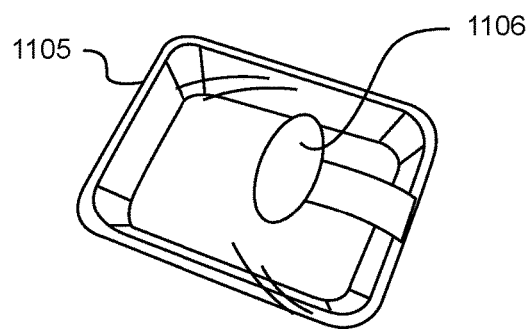
FIG. 11F is an exemplary diagram illustrating one variation of a food container.

FIG. 11F is an exemplary diagram illustrating another variation of a food container 1105, the food container comprising a rigid lower structure and a cellophane type upper structure as may be frequently used as a traditional supermarket package for meats. A label 1006 is typically applied to the container after affixing the cellophane top structure to and about the rigid bottom structure, the label incorporating a tag that was programmed and affixed to the structure at the time of manufacturing.

Figure 11G:
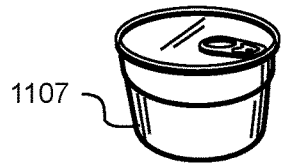
FIG. 11G is an exemplary diagram illustrating one variation of a food container.

FIG. 11G is an exemplary diagram illustrating another variation of a food container 1107, the food container, frequently referred to as a hybrid package, comprises a thermoplastic lower structure to which an upper metal retaining rim and pop-open cover has been affixed. The container may have a tag that was affixed directly, or indirectly, by means of a label affixed to the structure at the time food was introduced to the container during the manufacturing process.

The food, supplement and medicament containers just described are not intended to be exhaustive, and articulating the methods of affixing a tag to the many hundreds of foil, tear-open, vacuum-formed, and other types of containers would be burdensome. Nevertheless, doing so would show that the tag of one or more of the various embodiments may be affixed to any type of container into which pet food, nutritional supplements or medicaments may be packaged.

Figure 12:
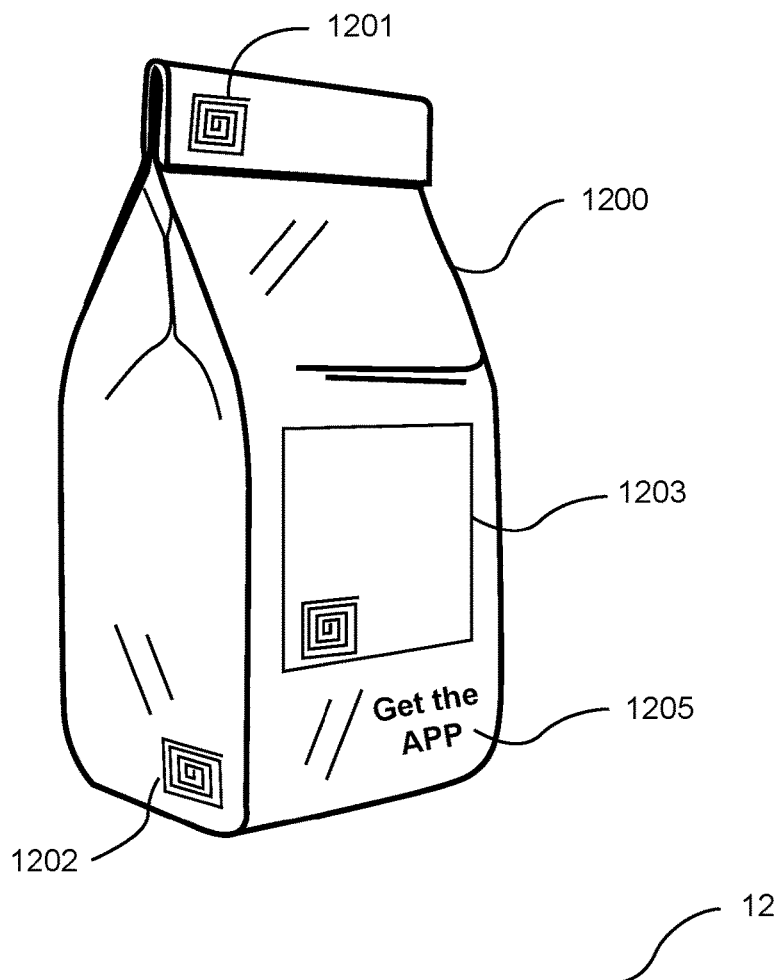
FIG. 12 is an exemplary diagram illustrating a food container with tag locations.

FIG. 12 is an exemplary diagram illustrating a food container with tag locations. More specifically, a typical dry food bag 1200 as described in FIG. 11E is shown with a tag 1202 that was embedded in the structure material at the time the material was manufactured, an alternate location of a tag 1201 that may have been affixed to the bag at the time it was sealed, and yet another location of a tag that was incorporated into a label 1200 and affixed to the bag during the food packaging cycle. Only one tag would be required to meet the minimum specifications of one or more of the various embodiments, but alternate locations and method of affixing the tags are shown merely for comparative purposes.

The tag is preferably programmed with certain information that may, or may not appear in human readable form on the label, the information being one or more of the data fields: customer name, pet's name, the duration of time for which the volume of food is intended to last at the daily food portion amount, daily food portion represented in various units, total container volume expressed in various units, production facility data, and other data as may be required by regulatory agencies. The data fields just described are not meant to be limiting.

Figure 13:
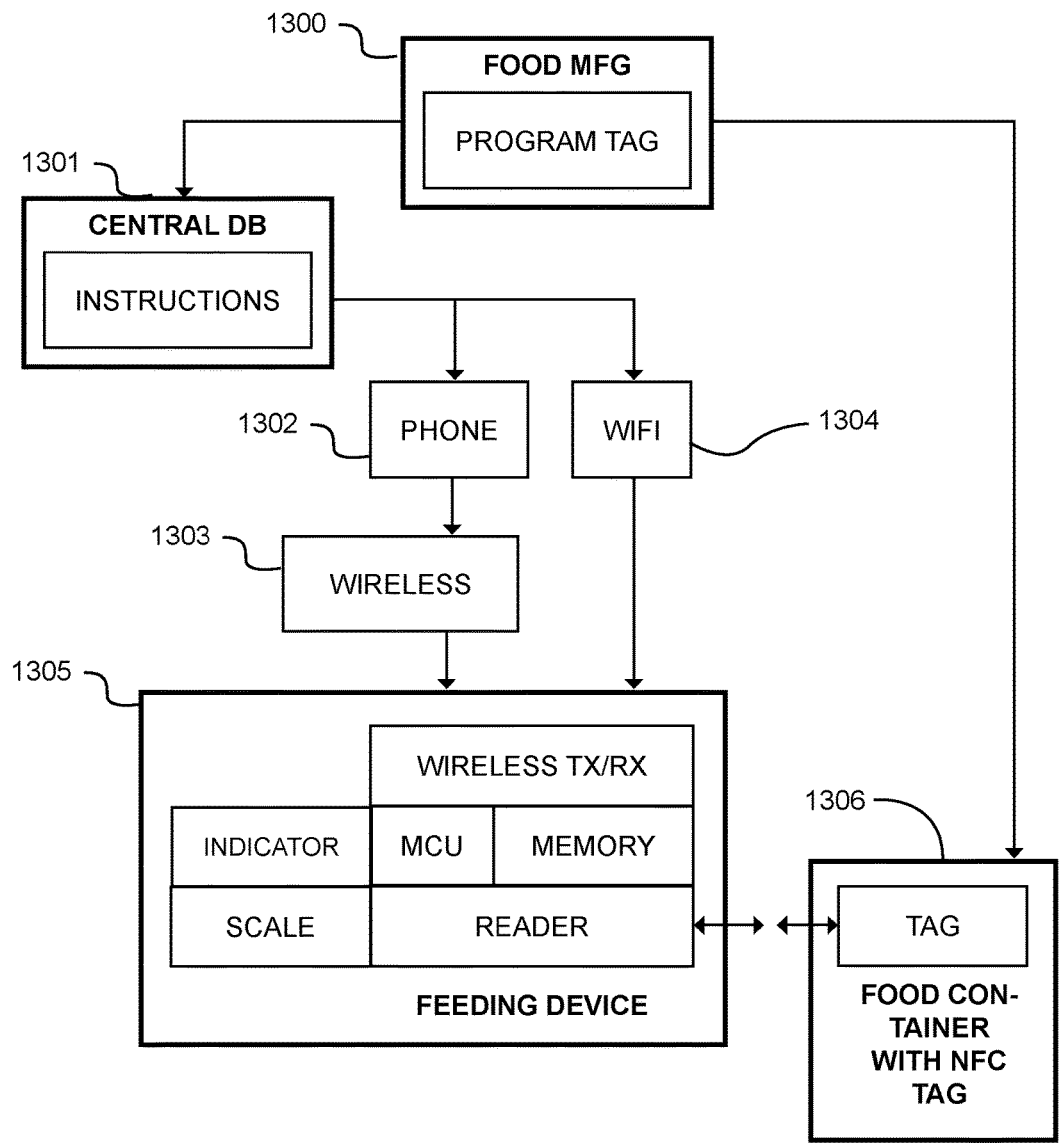
FIG. 13 is an exemplary block diagram of the components of a food tag container with a tag, and a reader on a network.

FIG. 13 is an exemplary block diagram of the components of a food tag container with a tag, and a reader on a network.

In the drawing a food manufacturer programs a tag 1300, and the associated programming data being stored with corresponding alert instructions in a central database 1301. The database communicates with a feeding device 1305 by means of a network, the network preferably comprising a cellular network to which a phone 1302 is in communication, and a forward communication from the phone being provided wirelessly 1303 to the feeding device. One alternate network may provide for the communication between a database and feeding device via the internet via WIFI 1304 using well known devices and interoperable communications protocols.

The feeding device 1305 preferably comprises a food scale, a tag reader, a processor and memory, a wireless transponder, and an audible and/or visual indicator. A tag 1036 affixed to a food item contains date related to the food and customer, the data being transferable between the tag of the food item and the reader of the feeding device.

Figure 14:
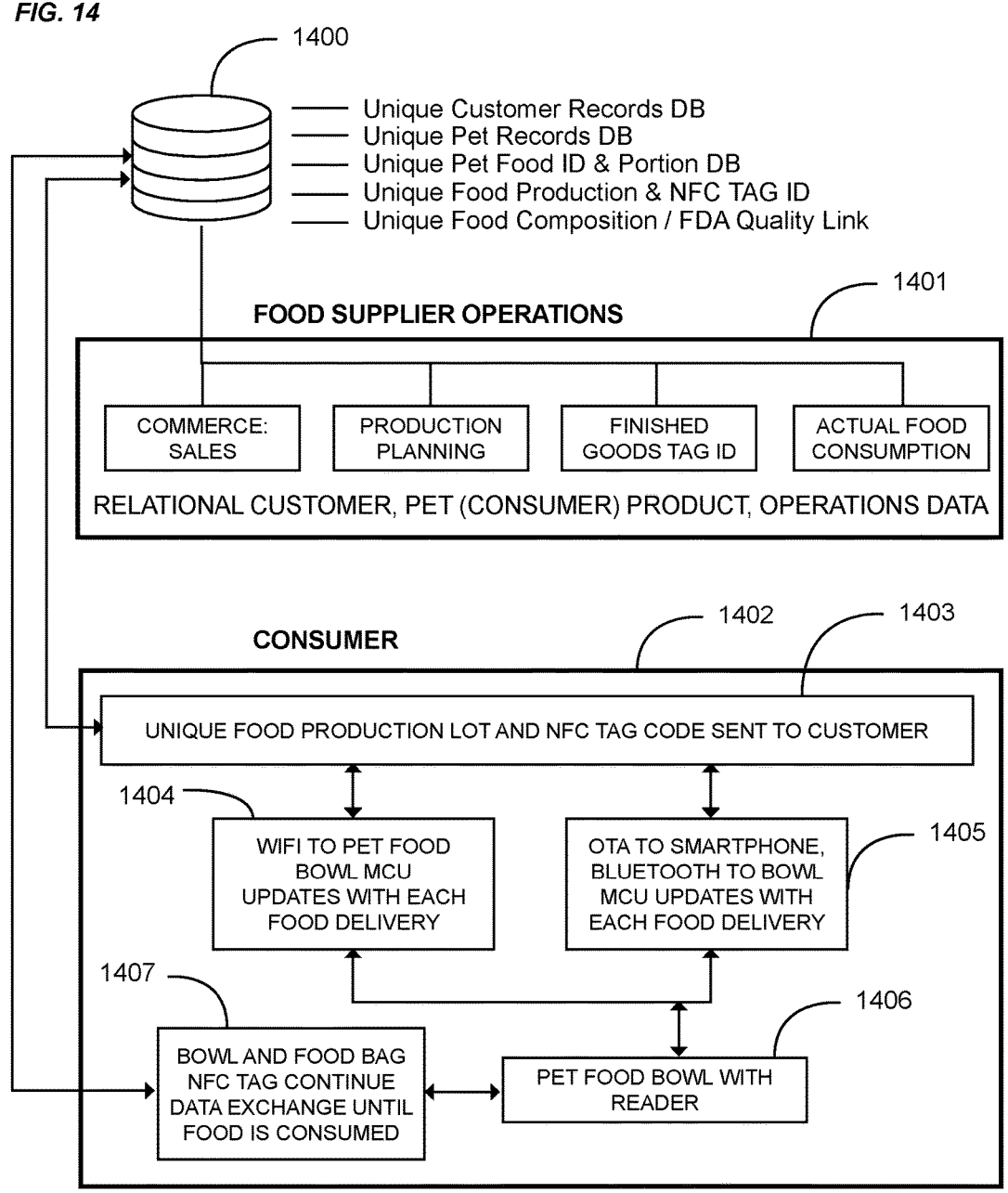
FIG. 14 is an exemplary block diagram of the supplier and consumer components of a pet feeding system and method.

FIG. 14 is an exemplary block diagram of the supplier and consumer components of a pet feeding system and method.

F. Food Manufacturing Operations.

In one or more of the various embodiments, the entirety of food production is a JIT-demand-driven under a model that incorporates food purchasing subscriptions, for instance, weekly production and delivery to each customer, with precise real-time knowledge of how many calories each pet customer will consume each day between subscription deliveries.

A central database, or a network of federated databases 1400 store and process a plurality of operationally integrated, or operationally compartmentalized databases, the databases comprising for example, but not limited to, unique customer records, unique pet records, pet food and food portion records, production history and production planning records, and food component source and safety data. The food and tightly correlated customer and pet databases are preferably in communication with supplier operations management software and databases, directly or via middleware.

Those skilled in the art of food production planning and production management will immediately appreciate that the predictive production requirements provided for by one or more of the various embodiments, for the first time, allow food production planners to base production on a just in time process rather than the outdated "plan based on historical models, evaluation of current sales commitments, and a variable estimate" to ensure production that is adequate to meet demand.

Therefore, critically important and previously unavailable data such as real-time actual food consumption can be integrated into overall food supplier operations 1401 thereby increasing predictive accuracy, efficiencies that translate to cost savings and preservation or operating cash, sales, production planning, and highly important, direct manufacturer-to-consumer relationship management that drives brand preference and goodwill.

G. System and Method to Increase Customer Loyalty and Retention.

The individualized pet food production of one or more of the various embodiments provides the consumer 1402 with an unprecedented level of nutritional awareness and food safety confidence. The system and method of one or more of the various embodiments incorporates a unique tag ID associated with the consumer's purchased food item 1403, the tag being in communication with a feeding system that updates food information with each subscription delivery 1404 and with each daily feeding 1405, the communication continuing between the food item tag and reader 1406 feeding device until the food in the container is exhausted 1407.

The system and method of one or more of the various embodiments therefore delivers to the consumer the assurance of immediate alerts when safety issues arise with their pet's food, assurance that they will continue to be delivered the freshest possible pet food on a preferred delivery schedule, and assurance that they are feeding their pet the precise number of calories that have been determined as the optimum daily portion for their pet.

No other pet food production and food tracking system has ever approached, not have any anticipated the functionality of one or more of the various embodiments.

Figure 15:
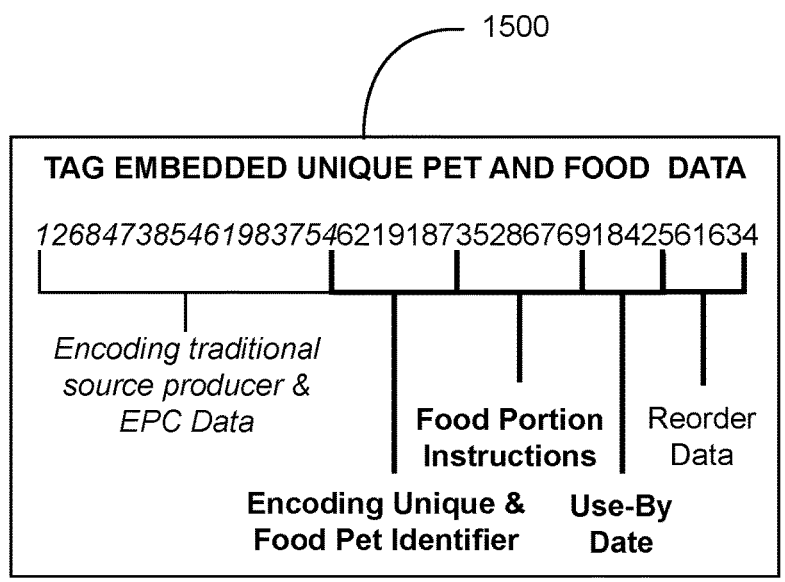
FIG. 15 is an exemplary block diagram of representative tag data programming components of a pet feeding system and method.

FIG. 15 is an exemplary block diagram of representative tag data programming components of a pet feeding system and method.

Coding schemes, protocols and data string lengths for tags vary widely. Therefore, rather than providing a precise coding scheme, the drawing shows a representative example of how certain pet production data may be incorporated into a data string.

The data 1500 embedded into a tag for a food item preferably incorporates at least the minimum information as required by regulations, and a unique pet food item identifier, and data related to a unique pet owner or pet that will consume the unique food item.

Nevertheless, other pet, food, production, date and time, reorder or other data may be additionally programmed into the tag at the time of manufacture.

Figure 16:
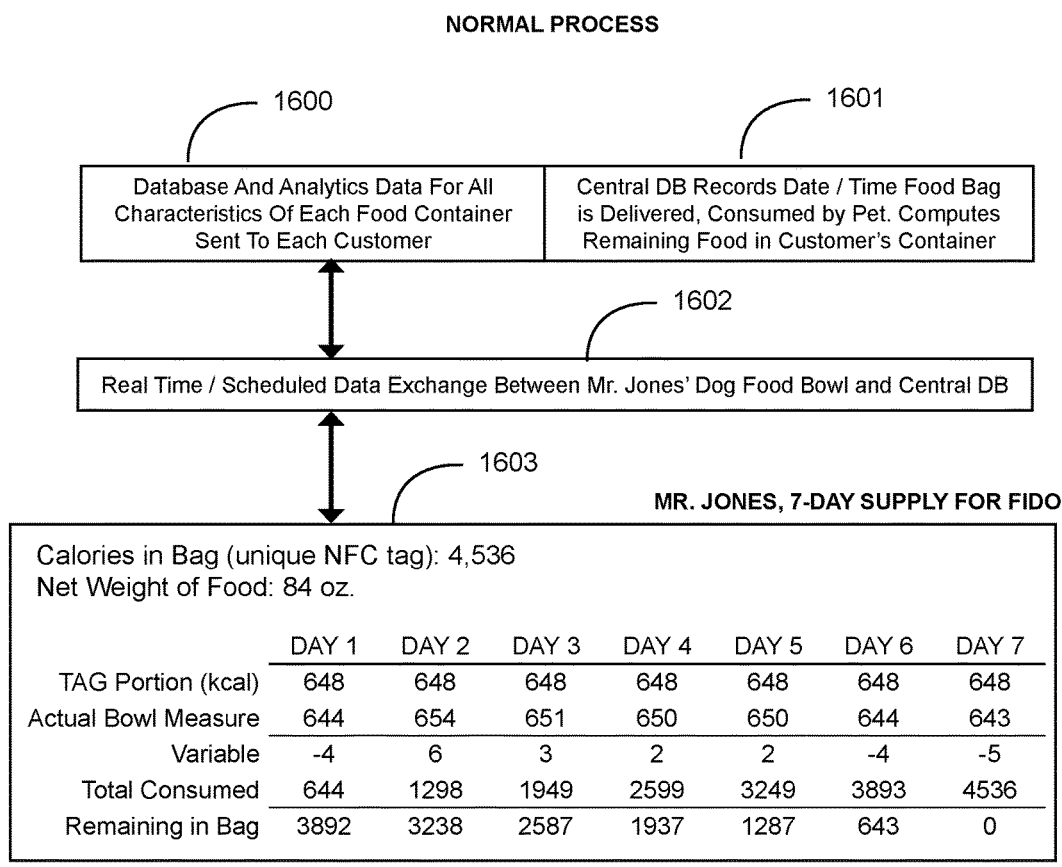
FIG. 16 is an exemplary block diagram showing the food consumption data analytics process of a pet feeding system and method.

FIG. 16 is an exemplary block diagram showing the food consumption data analytics process of a pet feeding system and method.

An embodiment provides for the real time data collection associated with each food item sent to each customer, and further continually analyzes 1600 the data for potential food safety issues that arise after the food is delivered to the customer. Further, one or more of the various embodiments provides for the perpetual data collection and analysis 1601 of real time food consumption rates related to each food item, and consolidates all data from all food items produced from each food production batch to determine the volume or percent of the food batch that has been consumed, and the total non-consumed food remaining in the consumer marketplace.

Real time and scheduled data exchange therefore 1062 therefore continues between a customer's pet food bowl and the food producer's central database.

A normal record 1603 in the database for a given customer may illustrate the actual and predicted daily food portion fed to the pet, and a running tabulation of the total consumed and unconsumed portion of the food in a unique container.

Figure 17:
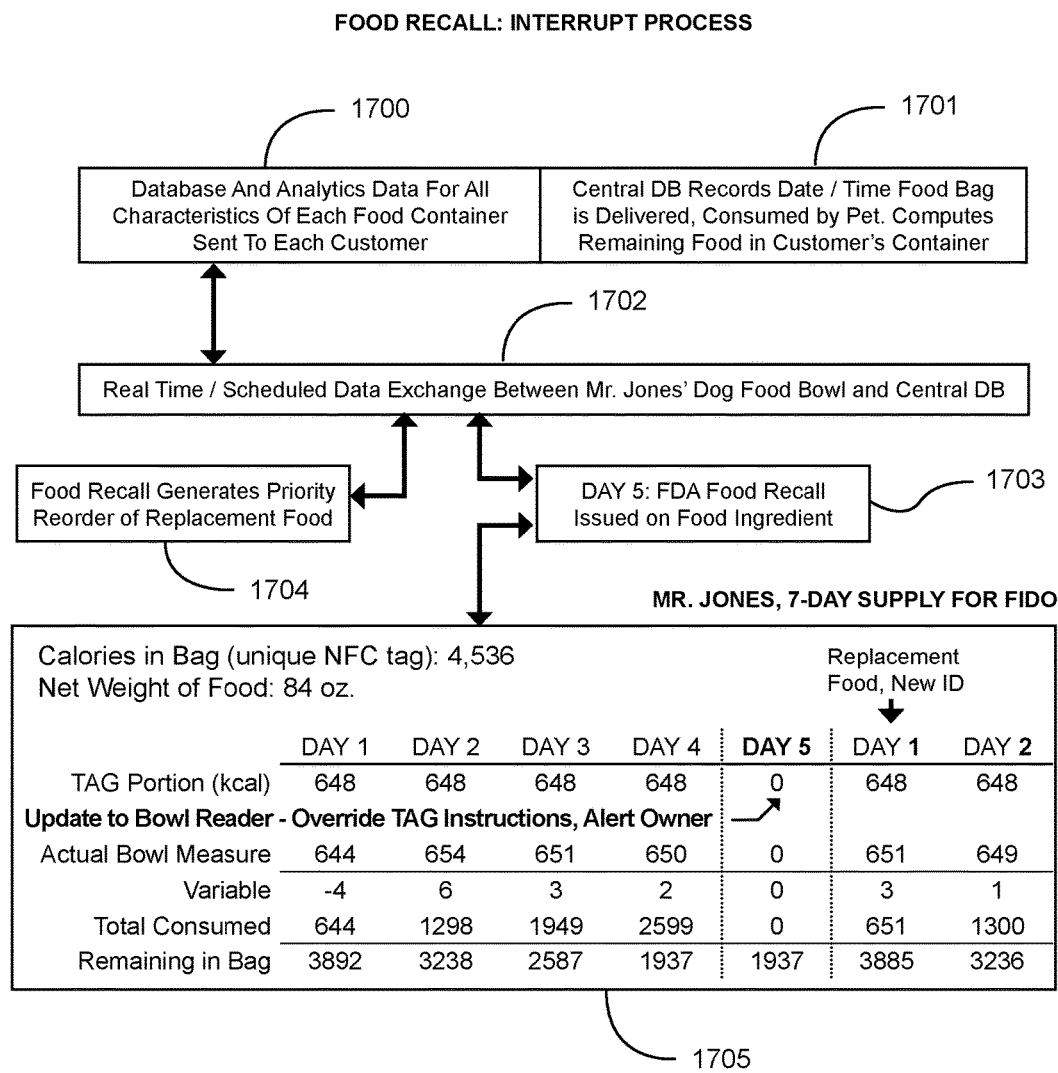
FIG. 17 is an exemplary block diagram showing the food consumption data analytics process of an interrupted pet feeding system and method.

FIG. 17 is an exemplary block diagram showing the food consumption data analytics process of an interrupted pet feeding system and method.

An embodiment provides for the real time data collection associated with each food item sent to each customer, and further continually analyzes 1700 the data for potential food safety issues that arise after the food is delivered to the customer. Further, one or more of the various embodiments provides for the perpetual data collection and analysis 1701 of real time food consumption rates related to each food item, and consolidates all data from all food items produced from each food production batch to determine the volume or percent of the food batch that has been consumed, and the total non-consumed food remaining in the consumer marketplace.

Real-time and scheduled data exchange 1702 therefore continues between a customer's pet food bowl and the food producer's central database.

In the instance that the individual food item is subject to a food recall 1703, the means to alert the customer as previously described are activated, and the customer immediately ceases feeding the pet the food from the recalled food item.

Further, the recall triggers the automated priority re-order of a replacement food item 1704 meeting the same customized parameters of each recalled food item, replacing the recalled food items with nutritionally similar replacements.

New tags will be programmed for and affixed to each replacement food item preferably following the processes previously described, with the effective USE date of the replacement item beginning on the date of arrival of the food item at the customer's location.

It should be noted that the subscription period may or may not change based on the delivery of a full food item replacement, and the payment period associated with each subscription delivery may or may not change, the decisions being business-based at the preference of the food supplier.

The drawing shows a representative data record 1705 illustrating an interruption in the feeding schedule of the pet on Day 5, Day 5 being the day that the food recall was issued and the priority overnight delivery of the replacement food activated. The daily food tracking of the replacement food resumed on the delivery day, in the example, Day 6.

As a means to mitigate residual risk and liability, the manufacturer, possessing the data related to all recalled food that was not consumed at the time of the consumer alert, may communicate directly with the owner to ensure that the owner follows the recommended protocol, for instance, verifying that the remaining volume of the recalled food was destroyed, or returned to a facility at the producer's direction.

Although specific embodiments have been illustrated and described herein, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the embodiments discussed herein.

At least one embodiment of the pet feeding system is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the pet feeding system will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the pet feeding system, suitable methods and materials are described above. Thus, the pet feeding system is not intended to be limited to the embodiments shown, but is to be accorded the widest scope consistent with the principles and features disclosed herein.

What is claimed is:
1. A pet feeding system, comprising:
   a container that stores a volume of a consumable product for a pet, wherein the container is configured to allow a user to selectively dispense the consumable product for consumption by the pet;
   a tag corresponding to the consumable product in the container, wherein the tag stores product data corresponding to the consumable product within the container; and
   a monitor device configured to communicate with the tag when the tag is near the monitor device;
   wherein the monitor device is configured to receive the product data from the tag and determine if the consumable product associated with the tag is acceptable for consumption by the pet based on the product data;
   wherein the monitor device is configured to provide an alert to the user if the consumable product associated with the tag is identified by the monitor device as not acceptable for consumption by the pet.
2. The pet feeding system of claim 1, wherein the tag is comprised of an RFID tag, NFC tag or a transponder.

3. The pet feeding system of claim 1, wherein the monitor device is comprised of a mobile phone.

4. The pet feeding system of claim 1, wherein the monitor device is comprised of a food bowl adapted for receiving the consumable product.

5. The pet feeding system of claim 1, wherein the monitor device is comprised of a reader.

6. The pet feeding system of claim 1, wherein the monitor device is configured to communicate with a server via a global computer network to identify potential consumption problems with the consumable product associated with the tag using the product data.

7. The pet feeding system of claim 1, wherein the product data includes an expiration date for the consumable product in the container, wherein the monitor device is configured to provide the alert to the user if the current date is after the expiration date for the consumable product in the container.

8. The pet feeding system of claim 1, wherein the monitor device is configured to acquire an expiration date from a server for the consumable product in the container, and wherein the monitor device is configured to provide the alert to the user if the current date is after the expiration date for the consumable product in the container.

9. The pet feeding system of claim 1, wherein the monitor device is configured to determine if the consumable product in the container is subject to a recall notice.

10. The pet feeding system of claim 1, wherein the monitor device is configured to provide safety instructions to the user when a consumption problem is identified.

11. The pet feeding system of claim 1, wherein the consumable product is comprised of food or medicine consumable by the pet.

12. The pet feeding system of claim 1, wherein the product data stored on the tag includes pet identification data identifying the pet the consumable product is to be consumed by.

13. The pet feeding system of claim 12, wherein the monitor device transmits the alert to the user if the pet identification data received from the tag does not correspond to the pet.

14. The pet feeding system of claim 1, wherein the monitor device is comprised of a food bowl with a reader and a scale, wherein the monitor device communicates with a server to determine an updated amount of consumable product to provide to the pet based on changed pet characteristics, and wherein the monitor device is configured to notify the user if too much consumable product is placed into the food bowl.

15. The pet feeding system of claim 1, wherein the alert is comprised of an audible alert or a visual alert.

16. The pet feeding system of claim 1, wherein the alert is provided to the user via a mobile device.

17. A method of using the pet feeding system of claim 1, comprising:
positioning the tag near the monitor device;
receiving by the monitor device the product data from the tag;
determining by the monitor device if the consumable product associated with the tag is acceptable for consumption by the pet; and
providing the alert to the user if the consumable product associated with the tag is not acceptable for consumption by the pet.

18. A pet feeding system, comprising:
a container that stores a volume of a consumable product for a pet, wherein the container is configured to allow a user to selectively dispense the consumable product for consumption by the pet;
a tag corresponding to the consumable product in the container, wherein the tag stores product data corresponding to the consumable product within the container, wherein the tag stores portion data corresponding to the pet, and wherein the portion data corresponds to an amount of consumable product to provide to the pet for consumption; and
a monitor device comprised of a food bowl, a reader and a scale, wherein the reader is configured to communicate with the tag when the tag is near the reader;
wherein the scale is configured to weigh an amount of consumable product received by the food bowl;
wherein the monitor device is configured to receive the product data from the tag and determine if the consumable product associated with the tag is acceptable for consumption by the pet based on the product data;
wherein the monitor device is configured to provide an alert to the user if the consumable product associated with the tag is identified by the monitor device as not acceptable for consumption by the pet or if too much consumable product is placed into the food bowl based on the portion data.

19. The pet feeding system of claim 18, wherein the monitor device is configured to receive updated portion data for the pet, wherein the updated portion data provides a different amount of consumable product to provide to the pet for consumption compared to the portion data.

20. A method of using the pet feeding system of claim 18, comprising:
positioning the tag near the monitor device;
receiving by the monitor device the product data and portion data from the tag;
pouring the consumable product into the food bowl;
weighing by the scale the amount of consumable product in the food bowl;
determining by the monitor device if the amount of consumable product is a proper food portion; and
providing the alert to the user if the amount of consumable product associated with the tag in the food bowl is the proper food portion.

* * * * *